United States Patent [19]
Liang

[11] Patent Number: 5,771,990
[45] Date of Patent: Jun. 30, 1998

[54] SHOCK ABSORBING FOOT MEANS

[76] Inventor: Shih-Tsung Liang, No. 10, Lane 31, Ta-Feng St., Lu-Chu Hsiang, Taoyuan County, Taiwan

[21] Appl. No.: 845,403

[22] Filed: Apr. 25, 1997

[51] Int. Cl.[6] .................................................. F16F 15/00
[52] U.S. Cl. .......................................... 181/208; 248/677
[58] Field of Search .................................. 248/677, 638, 248/636, 633, 635, 645, 118.8, 118.9, 611, 615; 181/207, 208, 206, 198, 199, 290; 361/82; 52/403.1

[56] References Cited

U.S. PATENT DOCUMENTS

| | | | |
|---|---|---|---|
| 4,880,077 | 11/1989 | Verse et al. | 181/207 |
| 5,210,383 | 5/1993 | Noxon | 181/290 |
| 5,344,116 | 9/1994 | Winkler | 248/677 |
| 5,570,867 | 11/1996 | Norkus | 248/635 |
| 5,710,396 | 1/1998 | Rogers | 181/208 |

FOREIGN PATENT DOCUMENTS 0159001  10/1985  European Pat. Off. ............... 248/677

*Primary Examiner*—Leslie A. Braun
*Assistant Examiner*—Tan Le
*Attorney, Agent, or Firm*—Rosenberg, Klein & Bilker

[57] ABSTRACT

A shock absorbing foot adapted for supporting an audio equipment on a flat surface, including a base adhered to a flat surface and having a top screw hole, a mounting plate adhered to a bottom side of an audio equipment and having a rounded recess at its bottom center, a receptacle threaded into the top screw hole of the base and having a top open chamber and a rounded recess at the center of the bottom of the top open chamber, and a support member having a plurality of projecting portions disposed in contact with the periphery of the top open chamber and two cones respectively engaging the rounded recess of the mounting plate and the rounded recess of the receptacle.

1 Claim, 3 Drawing Sheets

SHOCK ABSORBING FOOT MEANS

BACKGROUND OF THE INVENTION

The present invention relates to a shock absorbing foot used to support an audio equipment on a floor surface or table top, and more particularly to such a shock absorbing foot which effectively absorbs shocks during the operation of the audio equipment.

FIG. 3 shows a shock absorbing foot adapted for supporting an audio equipment 4 on a floor surface 5. The shock absorbing foot comprises a base 6 having a vertical center screw hole 61, a mounting plate 64 fixedly fastened to the bottom side of the audio equipment 4 and having a rounded recess 65 at the center of its bottom side, and an arrowhead support member 62 having a bottom screw rod 63 threaded into the vertical center screw hole 61 of the base 6 and a top point engaging the rounded recess 65 of the mounting plate 64. This structure of shock absorbing foot is not practical for use with a high power audio equipment because the arrowhead support member 62 cannot be oscillated within the base 6 to lessen shocks, shocks tend to be transmitted from the audio equipment 4 to the floor surface 5, causing a noise or resonance to be produced.

SUMMARY OF THE INVENTION

The present invention provides a shock absorbing foot adapted for supporting an audio equipment on a flat surface which effectively absorbs shocks. The shock absorbing foot comprises a base shaped like a truncated cone having a bottom side adhered to a flat surface by a double-sided adhesive pad, and a vertical screw hole at the center of a top side thereof; a receptacle shaped like a headed, cylindrical container and mounted on the base, the receptacle comprising an outer thread threaded into the screw hole of the base, a top open chamber having a horizontal bottom wall, and a rounded recess at the center of the horizontal bottom wall of the top open chamber; a mounting plate having a top side fastened to a bottom side of an audio equipment by a double-sided adhesive pad, a bottom side facing said base, and a rounded recess at the center of its bottom side; and a support member mounted in the top open chamber of the receptacle to support the mounting plate, the support member comprising a hexagonal flank, a plurality of projecting portions equiangularly spaced around the periphery of the hexagonal flank and disposed in contact with the periphery of the top open chamber of the receptacle, a top cone having a top point engaging the rounded recess of the mounting plate, and a bottom cone having a bottom point engaging the rounded recess of the receptacle.

DETAILED DESCRIPTION OF THE PREFERRED EMBODIMENT

Figure 1:
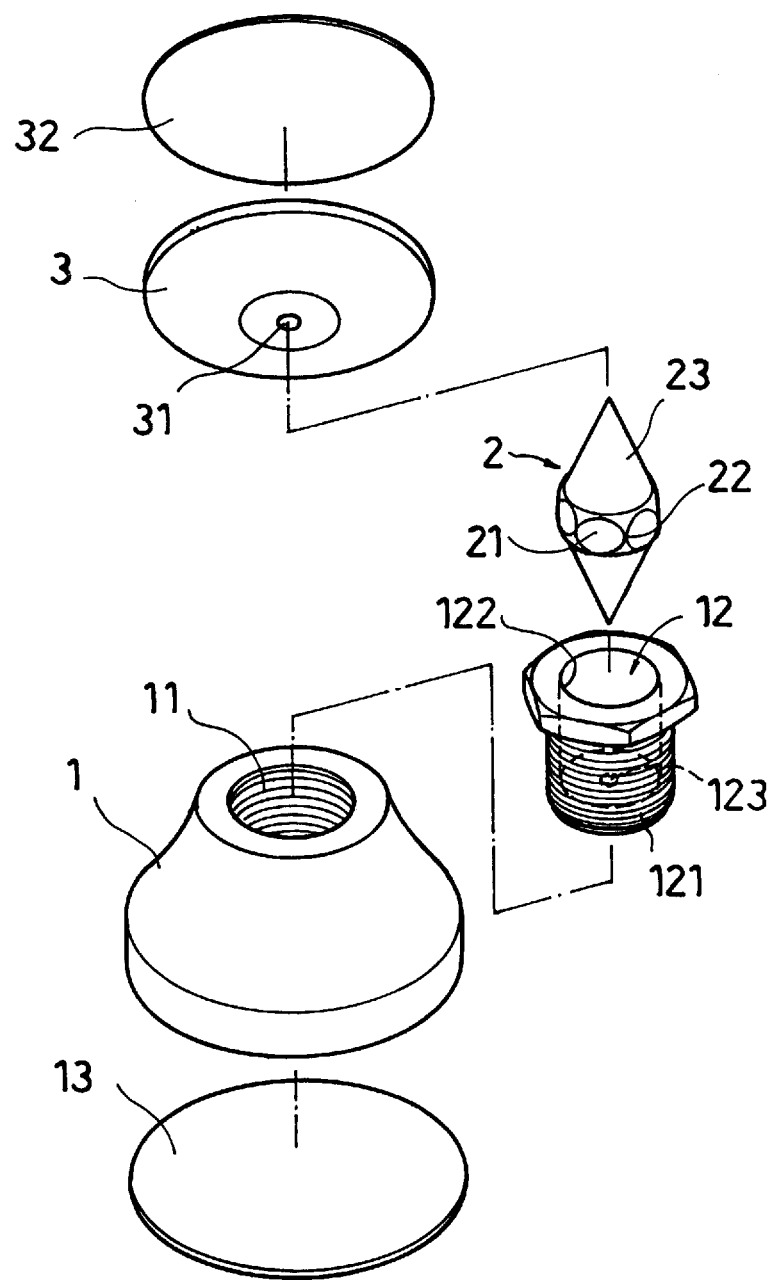
FIG. 1 is an exploded view of a shock absorbing foot for audio equipment according to the present invention.
Figure 2:
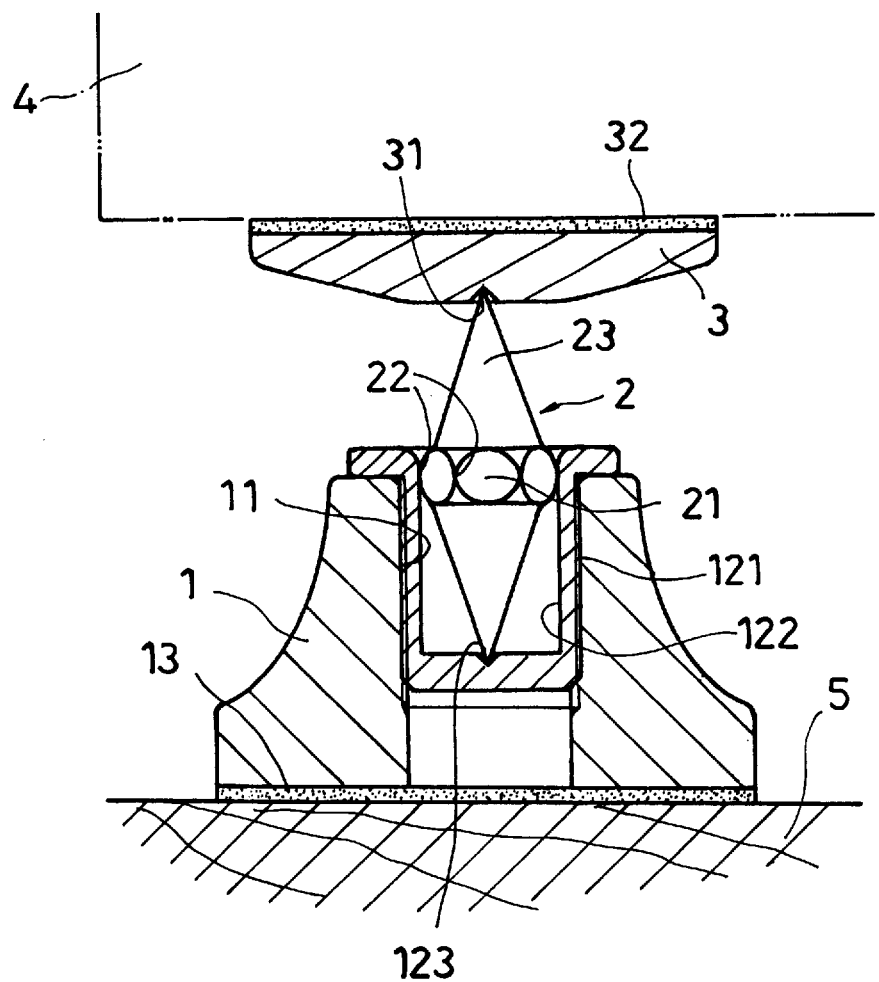
FIG. 2 is an installed view in section of the present invention.
Figure 3:
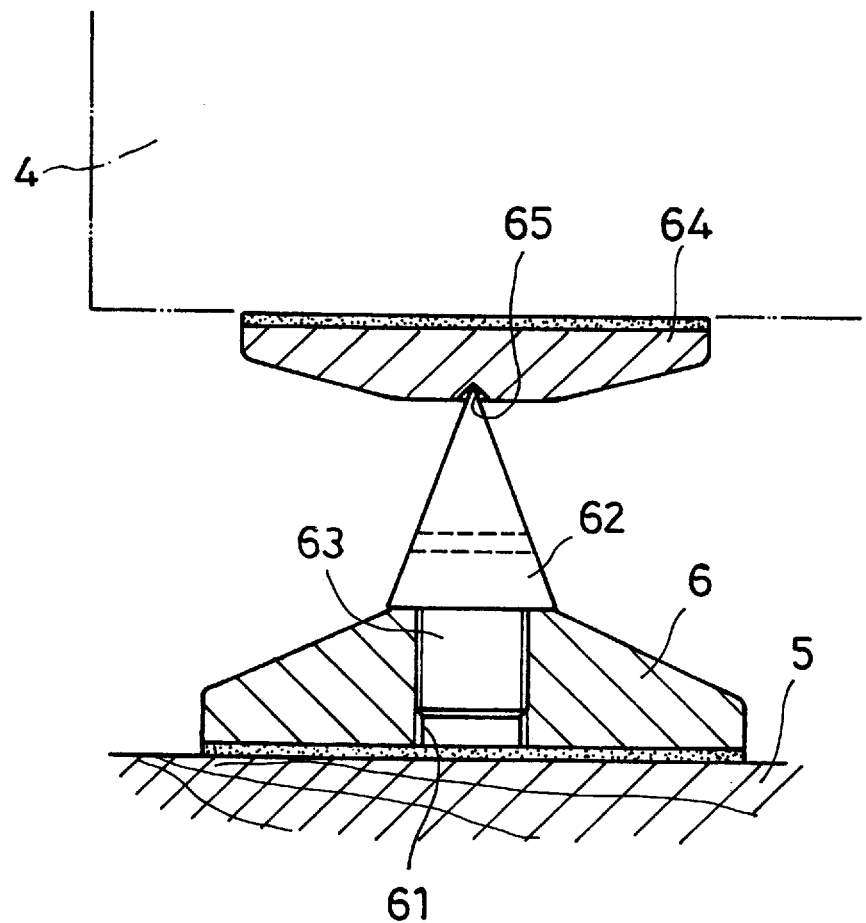
FIG. 3 is an installed view in section of a shock absorbing foot according to the prior art.

Referring to FIGS. 1 and 2, the present invention is adapted to be fastened to a bottom side of a high power audio equipment for supporting it on a floor surface or table top, comprised of a base 1, a mounting plate 3, a receptacle 12, and a support member 2. The base 1 is shaped like a truncated cone having a bottom side adhered to for example the floor 5 by a double-sided adhesive pad 13, and a vertical screw hole 11 at its top center. The receptacle 12 is shaped like a headed, cylindrical container, comprising an outer thread 121 threaded into the screw hole 11, a top open chamber 122, a rounded recess 12 at the center of the bottom wall of the top open chamber 122. The mounting plate 3 is fastened to a bottom side of an audio equipment 4 by a double-sided adhesive pad 32, having a rounded recess 31 at the center of its bottom side. The support member 2 is mounted in the top open chamber 122 of the receptacle 12 to support the mounting plate 3, having a hexagonal flank 21, a plurality of projecting portions 22 equiangularly spaced around the periphery of the hexagonal flank 21 and disposed in contact with the periphery of the top open chamber 122 of the receptacle 12, and two cones 23 at two opposite sides respectively engaging the rounded recess 31 of the mounting plate 3 and the rounded recess 123 of the receptacle 12.

Referring to FIG. 2 again, because the support member 2 has the pointed tips of its cones 23 respectively engaging the rounded recess 31 of the mounting plate 3 and the rounded recess 123 of the receptacle 12, and the projecting portions 22 of its flank 21 disposed in contact with the periphery of the top open chamber 122 of the receptacle 12, it will be forced to vibrate during the operation of the audio equipment 4, causing shock waves that come from the audio equipment 4 to be absorbed or lessened.

While only one embodiment of the present invention has been shown and described, it will be understood that various modifications and changes could be made thereunto without departing from the spirit and scope of the invention disclosed.

What the invention claimed is:

1. A shock absorbing foot adapted for supporting an audio equipment on a flat surface, comprising:

a base shaped like a truncated cone having a bottom side adhered to a flat surface by a double-sided adhesive pad, and a vertical screw hole at the center of a top side thereof;

a receptacle shaped like a headed, cylindrical container and mounted on said base, said receptacle comprising an outer thread threaded into the screw hole of said base, a top open chamber having a horizontal bottom wall, and a rounded recess at the center of the horizontal bottom wall of said top open chamber;

a mounting plate having a top side fastened to a bottom side of an audio equipment by a double-sided adhesive pad, a bottom side facing said base, and a rounded recess at the center of its bottom side; and a support member mounted in the top open chamber of said receptacle to support said mounting plate, said support member comprising a hexagonal flank, a plurality of projecting portions equiangularly spaced around the periphery of said hexagonal flank and disposed in contact with the periphery of the top open chamber of said receptacle, a top cone having a top point engaging the rounded recess of said mounting plate, and a bottom cone having a bottom point engaging the rounded recess of said receptacle.

* * * * *